Sept. 1, 1925.

H. M. HULL

LIQUID LEVEL GAUGE

Filed Sept. 28, 1922

1,551,744

INVENTOR.
Henry M. Hull
BY
G. H. Braddock
ATTORNEY.

Patented Sept. 1, 1925.

1,551,744

UNITED STATES PATENT OFFICE.

HENRY M. HULL, OF FAIRFIELD, CONNECTICUT.

LIQUID-LEVEL GAUGE.

Application filed September 28, 1922. Serial No. 591,136.

*To all whom it may concern:*

Be it known that HENRY M. HULL, a citizen of the United States, and resident of Fairfield, in the county of Fairfield and State of Connecticut, has invented certain new and useful Improvements in Liquid-Level Gauges, of which the following is a specification.

This invention relates to a liquid gauge more especially adapted for use in connection with fuel tanks of automotive vehicles.

An object of the invention is to provide a novel liquid gauge and to associate the same with the filling opening of a fuel tank in such manner as to offer no interference to the filling of the tank through said opening.

A further object is to provide a liquid gauge for a fuel tank having a filling opening with closing cap and to associate the gauge with said cap and opening so that when the cap is removed the gauge will be presented to enable the amount of fuel in the tank to be readily ascertained but will be situated to allow filling of the tank through the opening, and so that when the cap is replaced it can serve as the means for holding the gauge within the tank, out of view, in position to present itself when the cap is removed.

Still further objects are to provide a device of the present character the graduated stem of which will have sliding movement whereby the indicating marks of the gauge will always be presented to be read from one position; and to equip the device with a gauge ring having a converging or obliquely disposed wall adjacent the filling opening whereby the liability of escape of liquid fuel from the tank, past the gauge and cover of the closing cap, will be reduced to a minimum.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and meant in no way in a limiting sense, changes in details of construction and arrangement of parts being permissible so long as within the scope of the appended claims.

In the accompanying drawing forming a part of this specification,

Figure 1:
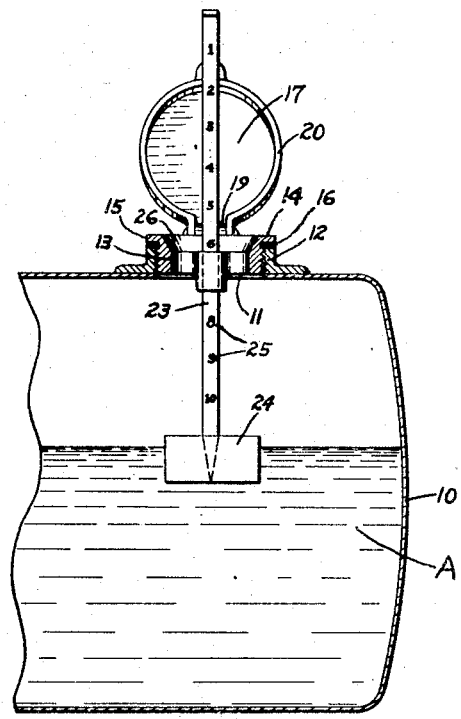
Fig. 1 is a view of a part of a tank or container showing the novel liquid gauge applied for use, the gauge being shown in section and the tank closing cap in open position.
Figure 2:
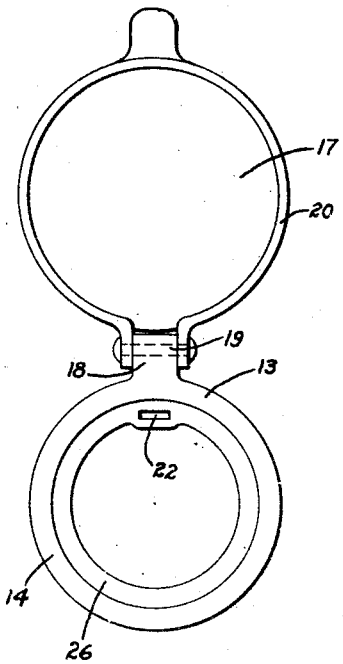
Fig. 2 is a plan view on an enlarged scale, disclosing the gauge ring and closing cap, the cap being in open position.

With respect to the drawing and the numerals of reference indicated thereon, 10 denotes a container or tank and 11 denotes the filling opening thereof.

As shown, the filling opening is provided with an internally threaded collar 12 receiving an externally threaded gauge ring 13, the ring having a horizontally arranged annular flange 14 with outer circumferential wall 15, there being a gasket 16 between the flange 14 and the upper edge of the collar 12 for an obvious purpose.

Figure 3:
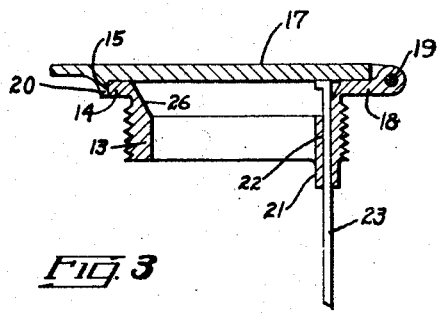
Fig. 3 is a sectional view on an enlarged scale of the gauge and closing cap, showing the cap in closed position.

A cover 17 may be hinged upon a lug 18 of the gauge ring as denoted at 19. Preferably, the cover has an annular flange 20 adapted to closely fit the annular flange 14 of the gauge ring to be contiguous with the circumferential wall 15 when the cover is in closed position, the fit being a frictional one so that more or less effort is required to remove the cover when fastened down as in Fig. 3. The cover can, however, be fastened down upon the ring in any suitable manner.

The gauge ring desirably has a downwardly extending guide tube 21 and the gauge ring and guide tube are provided with an aperture 22 to slidably receive a stem 23, the aperture preferably being vertically disposed and located adjacent the hinge for the cover as disclosed.

The lower end of the stem is anchored to a float 24 in any ordinary or preferred manner, and the body of the stem is graduated, 25 representing indicating marks thereon.

The wall 26 of the gauge ring is obliquely disposed, or converges from top to bottom, toward the filling opening, to minimize the liability of the escape of fuel.

As has been suggested, the threaded ring becomes an integral part of the tank and is not removed when filling the tank with fuel, the aperture of the ring being situated close to the inside thereof allowing a filling opening of sufficient size to insert a hose nozzle. The aperture 22 as shown is rectangular. It can be of different shape, but the arrangement is preferably such that the stem can have sliding movement only in the aperture so that the indicating marks will always be presented upon the same side of the gauge to be seen from one position.

When the cover is open, the float rests upon the fuel A, as in Fig. 1, and the stem projects beyond the gauge ring a distance corresponding to the depth of the fuel. The indicating marks then denote the amount of fuel in the tank. When the cover is fastened down, the upper end of the stem 22 bears against it, as in Fig. 3, the frictional engagement between the cover and gauge ring insuring the closed position of the cover against the rising action of the float.

Having thus fully described the invention, what I claim as new and desire to secure by Letters Patent is:

1. In combination with a tank having a filling opening, a gauge ring secured in said opening and having a passage way communicating with said tank and a guide tube adjacent said passage way, a stem slidable in said guide tube and arranged at one side of said passage way, a float upon said stem and within said tank, and a cover associated with said ring to be in open or closed position, said float being adapted to rest upon a liquid in said tank when the cover is in open position, and said cover constituting means when in closed position for holding said float down against its natural rising action.

2. In combination with a tank having a filling opening, a gauge ring secured in said opening and having a passage way communicating with said tank and a guide tube adjacent said passage way, a stem slidable in said guide tube and arranged at one side of said passage way, a float upon said stem and within said tank, and a cover associated with said ring to be in open or closed position, said float being adapted to rest upon a liquid in said tank when the cover is in open position, said ring including an annular flange, and said cover including an annular flange adapted to closely fit the annular flange of the ring and to constitute means when in closed position for holding said float down.

Signed at Bridgeport in the county of Fairfield and State of Connecticut this 25th day of August, A. D. 1922.

HENRY M. HULL.